(12) United States Patent
Wang et al.

(10) Patent No.: US 7,646,741 B2
(45) Date of Patent: Jan. 12, 2010

(54) METHOD FOR CLIENT-BASED MULTICAST MESSAGE TRANSMISSION

(75) Inventors: Zhibi Wang, Woodridge, IL (US); Jie Zhou, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1101 days.

(21) Appl. No.: 10/692,207

(22) Filed: Oct. 23, 2003

(65) Prior Publication Data
US 2005/0089006 A1    Apr. 28, 2005

(51) Int. Cl.
*H04W 4/00* (2009.01)
(52) U.S. Cl. .................. 370/328; 370/390; 370/392; 370/400
(58) Field of Classification Search .............. None
See application file for complete search history.

(56) References Cited

U.S. PATENT DOCUMENTS

| 7,107,066 | B2* | 9/2006 | Toth et al. .................. 455/458 |
| 7,149,195 | B2* | 12/2006 | Kall et al. ................... 370/328 |
| 2002/0057678 | A1* | 5/2002 | Jiang et al. .................. 370/353 |
| 2003/0227916 | A1* | 12/2003 | Paila et al. .................. 370/390 |
| 2004/0225733 | A1* | 11/2004 | Tesink et al. ................ 709/225 |

OTHER PUBLICATIONS

ADC NewNet, Inc., ADC Telecommunications, NewNet SMserver, Wireless Short Message Service Tutorial, Copyright 1999 (17 pages).
Wireless Developer Network—A ThinkBurst Media Trade Community, Copyright 2000-2003, ThinkBurst Media, Inc., Short Message Service: What, How and Where?, http://www.wirelessdevnet.com/channels/sms/ features/sms.html (9 pages).

* cited by examiner

*Primary Examiner*—Jayanti K Patel
*Assistant Examiner*—Jung Park
(74) *Attorney, Agent, or Firm*—Fay Sharpe LLP

(57) ABSTRACT

A messaging client and associated method for client-based multicast message transmission is provided. In one embodiment, the messaging client includes a message origination process with an input device, message buffer, recipient list, new message area, and multicast message transmission process. In one embodiment, the method includes: a) receiving a message content to be transmitted in a message, b) receiving delivery information for first and second recipients to whom the message is to be transmitted, c) receiving an instruction to begin the message transmission, d) transmitting the message from the client to the first recipient, and e) transmitting the message from the client to the second recipient. The messaging client and associated method relate to short message service (SMS), enhanced message service (EMS), multimedia message service (MMS), and other types of similar message services.

14 Claims, 4 Drawing Sheets

METHOD FOR CLIENT-BASED MULTICAST MESSAGE TRANSMISSION

BACKGROUND OF INVENTION

The invention generally relates to client-based multicast message transmission and, more particularly, to a short message service (SMS) client and a method for client-based multicast message transmission and will be described with particular reference thereto. However, it is to be appreciated that the invention is also amenable to other applications. For example, the invention may be implemented in clients for enhanced message service (EMS), multimedia message service (MMS), and other types of similar message services.

SMS is the transmission of short text messages to and from a telephone number and/or an Internet protocol (IP) address. Messages are usually limited to no longer than 160 alphanumeric characters and contain no images or graphics. EMS is an extension of SMS that permits messages with special text formatting (i.e., bold or italic), animations, pictures, icons, sound effects, and special ring tones. MMS is an additional messaging service that reflects another step in the evolution of SMS. Under MMS, users may combine graphics, video clips, sound files, and short text messages in a multimedia message that is displayed in a predetermined sequence.

Current telecommunication networks provide point-to-point SMS. Typically, SMS is used to transmit messages to and from mobile stations (MSs) via wireless networks, including personal communication system (PCS), global system for mobile communications (GSM), code division multiple access (CDMA), time division multiple access (TDMA), and paging networks. However, other types of devices capable of transmitting or receiving short messages via other types of networks, such as the public switched telephone network (PSTN), private telephone networks, the Internet, and private intranets and internets, have also been developed.

For point-to-point message transmissions, only one recipient is permitted for each message. Therefore, if someone wants to send the same message to multiple recipients, that person must re-create the same message for each additional recipient and send it multiple times using the point-to-point method.

Some service providers offer proprietary server-based point-to-many (i.e., multicast) SMS solutions that piggyback on the point-to-point SMS technology. In other words, these solutions allow a subscriber to setup a "group" that identifies multiple recipients for subsequent messages. The "group" is the destination point with respect to the point-to-point SMS and the service provider takes care of distributing the message to the multiple recipients.

For server-based multicast message transmissions, the group must be defined in advance, for example, in a subscriber's home location register (HLR). These pre-defined groups are static at the time the message is created and ready to send. This is extremely inconvenient, especially when the group is dynamically changing. For example, if the subscriber wants to send the message to another recipient not currently defined in the group, the subscriber must re-create the message and send it again. Another problem arises if the subscriber does not want the message to go to one of the recipients included in the group. Here, the subscriber must either modify the group before sending the message or re-create the message for each desired recipient and simply use the point-to-point method. Moreover, proprietary server-based point-to-many SMS solutions may not be compatible with networks managed by other providers. Hence, delivery of multicast messages to networks that are not compatible is not possible.

As can be appreciated from the foregoing, there is motivation for a device and corresponding method that provides client-based multicast message transmission.

BRIEF SUMMARY OF INVENTION

In one aspect of the invention, a method for client-based multicast message transmission is provided. The method includes: a) receiving a message content to be transmitted in a message, b) receiving delivery information for first and second recipients to whom the message is to be transmitted, c) receiving an instruction to begin the message transmission, d) transmitting the message from the client to the first recipient, and e) transmitting the message from the client to the second recipient.

In another embodiment, the method for client-based multicast message transmission includes: a) receiving a message content to be transmitted in a message, b) receiving delivery information for first and second recipients to whom the message is to be transmitted, c) receiving an instruction to begin the message transmission, d) transmitting the message to the first recipient and a request for a response indicating an outcome for the message transmission, e) transmitting the message to the second recipient and a request for a response indicating an outcome for the message transmission, f) receiving a report indicating an outcome for the message transmission to the first recipient, and g) receiving a report indicating an outcome for the message transmission to the second recipient.

In another aspect of the invention, a messaging client for transmitting a message to multiple message recipients using a client-based multicast message transmission method is provided. The messaging client includes: a means for receiving a message content to be transmitted in the message, delivery information for first and second recipients to whom the message is to be transmitted, and an instruction to begin the message transmission and a means for transmitting the message to the first and second recipients, wherein the transmission to the second recipient is independent from the transmission to the first recipient.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
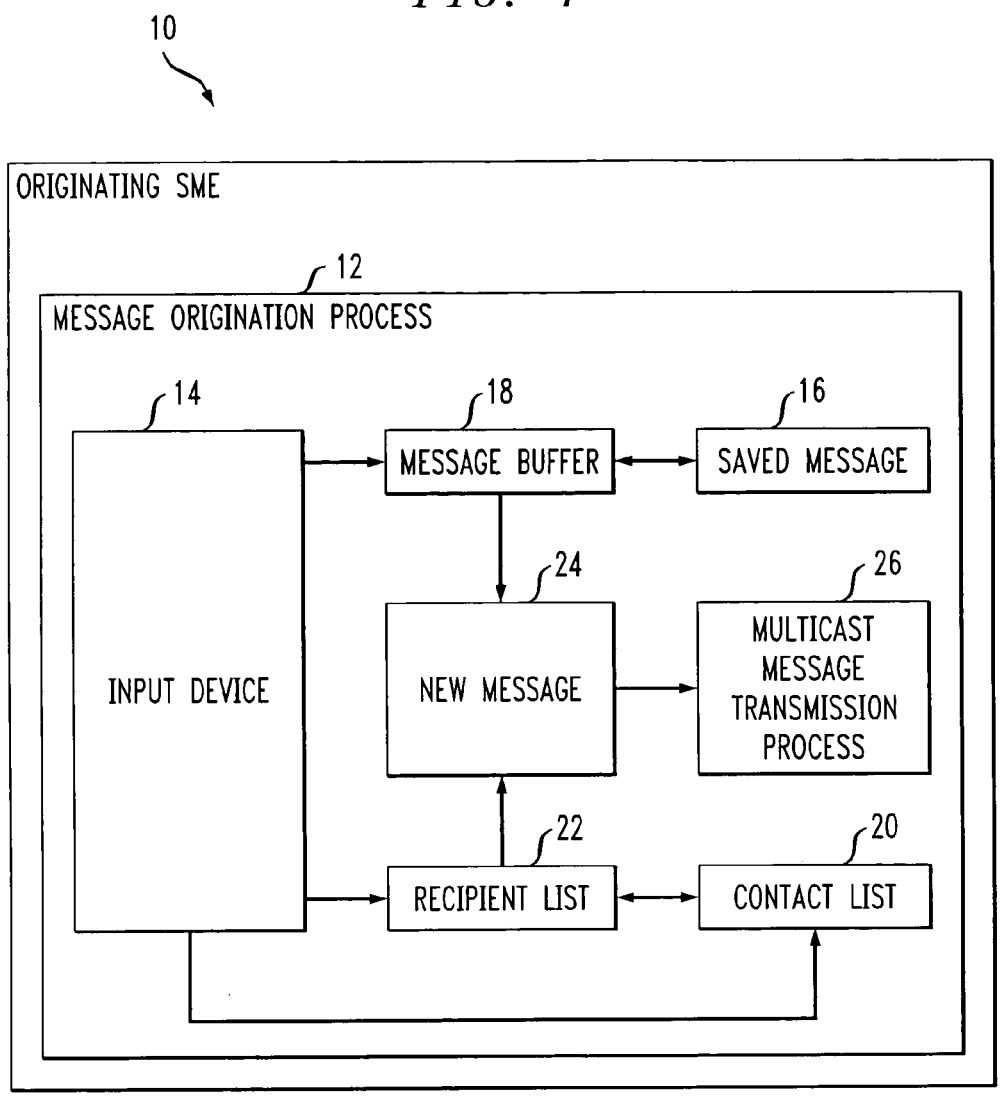
FIG. 1 is a block diagram of an embodiment of an originating client (i.e., short message entity (SME)) incorporating at least one aspect of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

A device capable of transmitting and/or receiving a short message is commonly referred to as a short message entity (SME) and may be generally referred to as a client. This description uses SME and client interchangeably unless otherwise specified. Of course, if a particular client is not able to transmit or receive a short message it is not an SME. Moreover, while this description uses the example of SMEs and short message transmission, it is understood that the invention, including client-based multicast message transmission, is also suitable for enhanced message entities (EME) and enhanced message transmission as well as multimedia message entities (MME) and multimedia message transmission.

With reference to FIG. 1, an originating SME 10 includes a message origination process 14. The message origination process 14 includes an input device 14, a saved message area 16, a message buffer 18, a contact list 20, a recipient list 22, a new message area 24, and a multicast message transmission process 26. The saved message area 16 and contact list 20 are optional components. Usually, the originating SME is a mobile device, such as a mobile station (MS), a pager, etc. However, any type of device capable of sending a short message is an originating SME, including personal display adapters (PDAs), personal computers, and any device with access to the Internet.

The input device 14 may be a voice recognition device, keypad, keyboard, pointing device, or any arrangement of pushbuttons, switches, or controls suitable for creating a short message. The contact list 20 is a list of contacts stored by any type of suitable storage device. Contact/message delivery information, such as name, telephone number, and/or e-mail address for each individual contact, may be stored in the contact list 20. Multiple individual contacts may be identified as a group contact. The input device 14 is in communication with the message buffer 18, contact list 20, and recipient list 22. A user of the originating SME 10 may use the input device 14, in conjunction with a display device and user interface, to add, modify, and/or delete contacts and contact/message delivery information stored in the contact list 20. Similarly, the input device 14 may be used to create or modify a message stored in the message buffer 18 and message delivery information associated with a recipient stored in the recipient list 22. The recipient list 22 permits identification of multiple recipients for the short message that is to be transmitted.

Messages may be saved from the message buffer 18 to the saved message area 16 for use at a later time. The saved message area 16 may be any type of storage device suitable for storing messages. A saved message may be retrieved from the saved message area 16 to the message buffer 18 and, if necessary, modified using the input device 14 prior to transmission. Similarly, message delivery information associated with recipients added to the recipient list 22 may be saved as contacts in the contact list 20. Contacts in the contact list 20 may be selected as recipients in the recipient list 22. When a contact is selected from the contact list 20, the appropriate contact information is communicated to the recipient list 22.

The message content stored in the message buffer 18 and message delivery information stored in the recipient list 22 are combined in the new message area 24. The combined message content and message delivery information is communicated from the new message area 24 to the multicast message transmission process 26 when the short message transmission is initiated. Usually, the short message transmission is initiated by the user pressing a button or selecting an icon. The multicast message transmission process 26 transmits the message to a first recipient in the recipient list via a suitable communication network associated with the originating SME 10. If there are multiple recipients in the recipient list, the multicast message transmission process 26 transmits the message to a next recipient in the same manner until the message is transmitted to each recipient in the recipient list. The recipient list includes an end of recipient list marker, flag, count, or similar information holder so that the multicast transmission process 26 recognizes when there are no more recipients for which to transmit the message.

Figure 2:
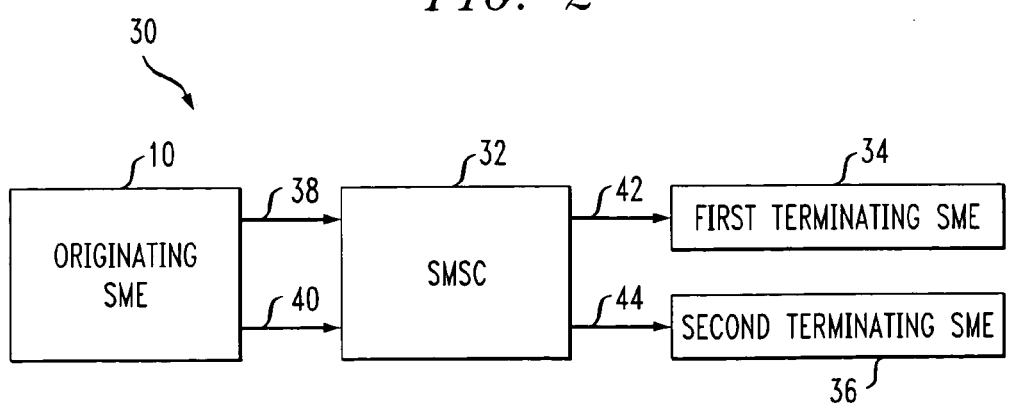
FIG. 2 is a block diagram of an embodiment of a telecommunication system incorporating the originating SME of FIG. 1.

With reference to FIG. 2, a telecommunication system 30 includes the originating SME 10, a short message service center (SMSC) 32, a first terminating SME 34, and a second terminating SME 36. The SMSC 32 is responsible for storing and forwarding short messages between SMEs. The originating SME 12 communicates a short message destined for two terminating SMEs to the SMSC 32. This is shown by reference numbers 38 and 40. This communication may be directed through any combination of one or more wireless networks (e.g., PCS, GSM, CDMA, TDMA) and/or any combination of one or more landline networks (e.g., PSTN) suitable for handling the short message.

The SMSC 32 communicates the appropriate instance of the short message to the first terminating SME 34 (shown by reference number 42). Likewise, the SMSC 32 communicates the appropriate instance of the short message to the second terminating SME 36 (shown by reference number 44). These communications may also be directed through any combination of one or more wireless networks (e.g., PCS, GSM, CDMA, TDMA) and/or any combination of one or more landline networks (e.g., PSTN) suitable for handling the short message. Notably, the two communications may be directed through different networks due to various characteristics of the terminating SME. For example, the location of a given terminating SME, the service provider associated with a given terminating SME, and/or the communication interfaces available to the terminating SME.

Figure 3:
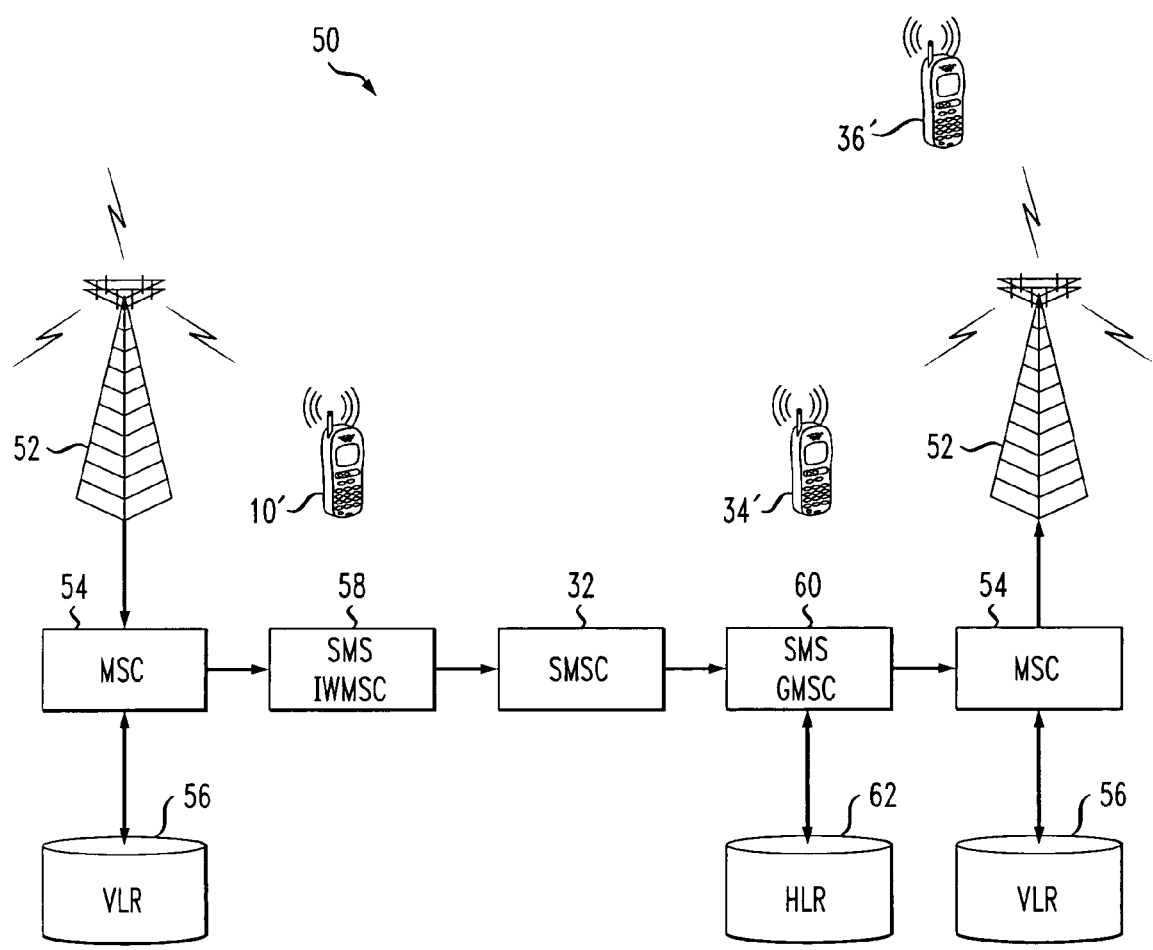
FIG. 3 is a block diagram of an exemplary wireless network including an embodiment of a mobile station (MS) incorporating at least one aspect of the invention.

With reference to FIG. 3, an exemplary wireless network 50 includes an originating MS 10', SMSC 32, a first terminating MS 34', a second terminating MS 36', two base stations (BSs) 52, two mobile switching centers (MSCs) 54, two visitor location registers (VLRs) 56, an SMS inter-working MSC (SMS IWMSC) 58, an SMS gateway MSC (SMS GMSC) 60, and a home location register (HLR) 62.

The originating MS 10' communicates short messages to an associated BS 52 and otherwise operates as described above for the originating SME 10. The wireless network 50 provides an exemplary means whereby the originating MS 10' can create a short message and send it using the client-based multicast message transmission method described herein to multiple terminating MSs (e.g., first and second terminating MSs 34', 36'). The first and second terminating MSs 34', 36' receive short messages from an associated BS 52 and otherwise operate as described above for the first and second terminating SMEs. The first and second terminating MSs 34', 36' are associated with the same BS 52 for simplification. In actuality, the first and second terminating MSs 34', 36' may be located in different cells and associated with different BSs.

While the drawing reflects a wireless network 50 that supports short messages from the originating MS 10' to two recipients, additional terminating MSs associated with additional message recipients are envisioned.

The BSs 52 performs all radio-related functions within the wireless network 50 and its primary responsibility is to transmit voice and data traffic to an MS within its geographic coverage area (i.e., cell). Each BS 52 includes a base station controller (BSC) and one or more base transceiver station (BTS).

The MSCs 54 perform the switching functions of the wireless system 50 and control calls and messages to and from other telephone and data systems, including SMSCs 32. Typically, an MSC 54 handles calls for a plurality of BSs and is associated with the combined geographic coverage area.

The VLRs 56 are associated with the combined geographic coverage area of one or more MSCs 54. Each VLR 56 contains temporary information about mobile subscribers associated with an MS operating within the combined geographic coverage area of the one or more MSCs. For example, the VLR 56 can authenticate an MS (10', 34', 36') for the wireless system 50 and page a terminating MS 34', 36'.

The SMS inter-working MSC (SMS IWMSC) 58 is an MSC capable of receiving a short message from the originating portion of the wireless network. Short messages are communicated by the SMS IWMSC 58 to an appropriate SMSC 32. In some embodiments, the SMS IWMSC 58 may be integrated with the SMSC 32.

Similarly, the SMS gateway MSC (SMS GMSC) 60 is an MSC capable of receiving a short message from an SMSC. The SMS GMSC 60 interrogates an HLR 62 associated with the recipient identified in the message for routing information and then routes the message to the visited MSC associated with the recipient or terminating MS. In other words, message is routed to the MSC covering the geographic area within which the recipient or terminating MS is currently located.

Figure 4:
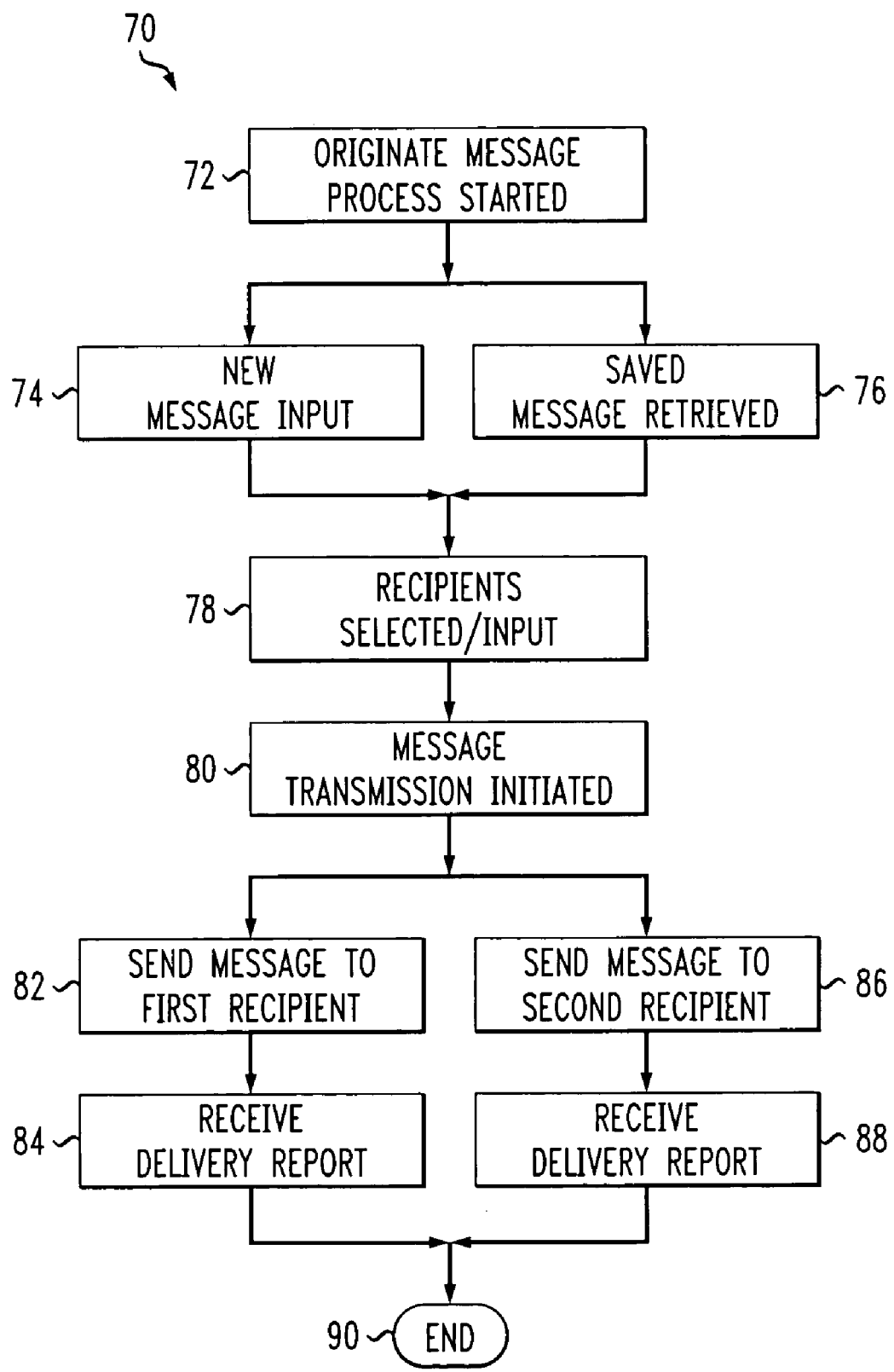
FIG. 4 is a flow chart of an embodiment of a method for client-based multicast message transmission in accordance with at least one aspect of the invention.

With reference to FIG. 4, a process 70 for client-based multicast message transmission begins at step 72 where an originate message process is started at a messaging client (e.g., SME, MS). Typically, the originate message process is initiated by a user associated with the messaging client. Next, a new message may be input (step 74) or a saved message may be retrieved (step 76). A new message is typically input by a user typing the message using a keypad or similar device. Other types of input devices may also be suitable for creating the message. For example, a voice recognition device permits the user to create the message by simply speaking. After a saved message is retrieved, it may be edited by the user via the input device.

At step 78, intended recipients of the message are selected and/or input. Notably, multiple recipients are permitted. If a contact list 20 (FIG. 1) is included in the messaging client, typically a user selects intended recipients from the contact list. Alternatively, the user may input intended recipients similar to the manner in which a message is input. Intended recipients may be input, for example, if a contact list is not provided or if an intended recipient is not currently included in the contact list.

Next, the message transmission is initiated (step 80). When the message is addressed to multiple recipients, this initiates a client-based multicast message transmission. Typically, the message transmission is initiated by a user pressing a send or transmit key on the messaging client. Of course, any type of control or control sequence suitable for initiating the transmission may be implemented.

At step 82, the message is transmitted from the messaging client to a first recipient. Typically, this step requires no interaction by the user associated with the messaging client. Once the message is delivered to the first recipient, a delivery report may be generated and returned to the messaging client. If the message cannot be delivered to the first recipient, a failure report may be generated and returned to the messaging client. At step 84, the delivery report or failure report is received by the messaging client. The delivery/failure report is an optional feature.

Assuming the message is intended for multiple recipients, at step 86, the message is transmitted from the messaging client to a second recipient. Like step 82, this step requires no interaction by the user associated with the messaging client. Once the message is delivered to the second recipient, a delivery/failure report may be generated as described for the first recipient. At step 88, the delivery report or failure report is received by the messaging client. Like step 84, the delivery/failure report is an optional feature. At step 90, the process has reached its end.

Steps mirroring steps 86 and 88 are performed for each additional message recipient. In one embodiment of the process, the steps 82 and 86 and any additional steps mirroring step 86 are sequential, effectively sequencing individual message transmissions by advancing through the recipient list. However, as shown in FIG. 4 and described above, parallel and/or multiplexed message transmissions are also permitted.

The client-based multicast message transmission process described above may be implemented by software, hardware, or a combination of hardware and software elements. When at least some portion of the process is implemented software, the software may be developed using binary runtime environment for wireless (BREW), Java 2 Micro Edition (J2ME), or other suitable platforms. The process may be integrated with other messaging entity processes within a subscriber identity module (SIM), such as those used in a GSM MS.

Figure 5:
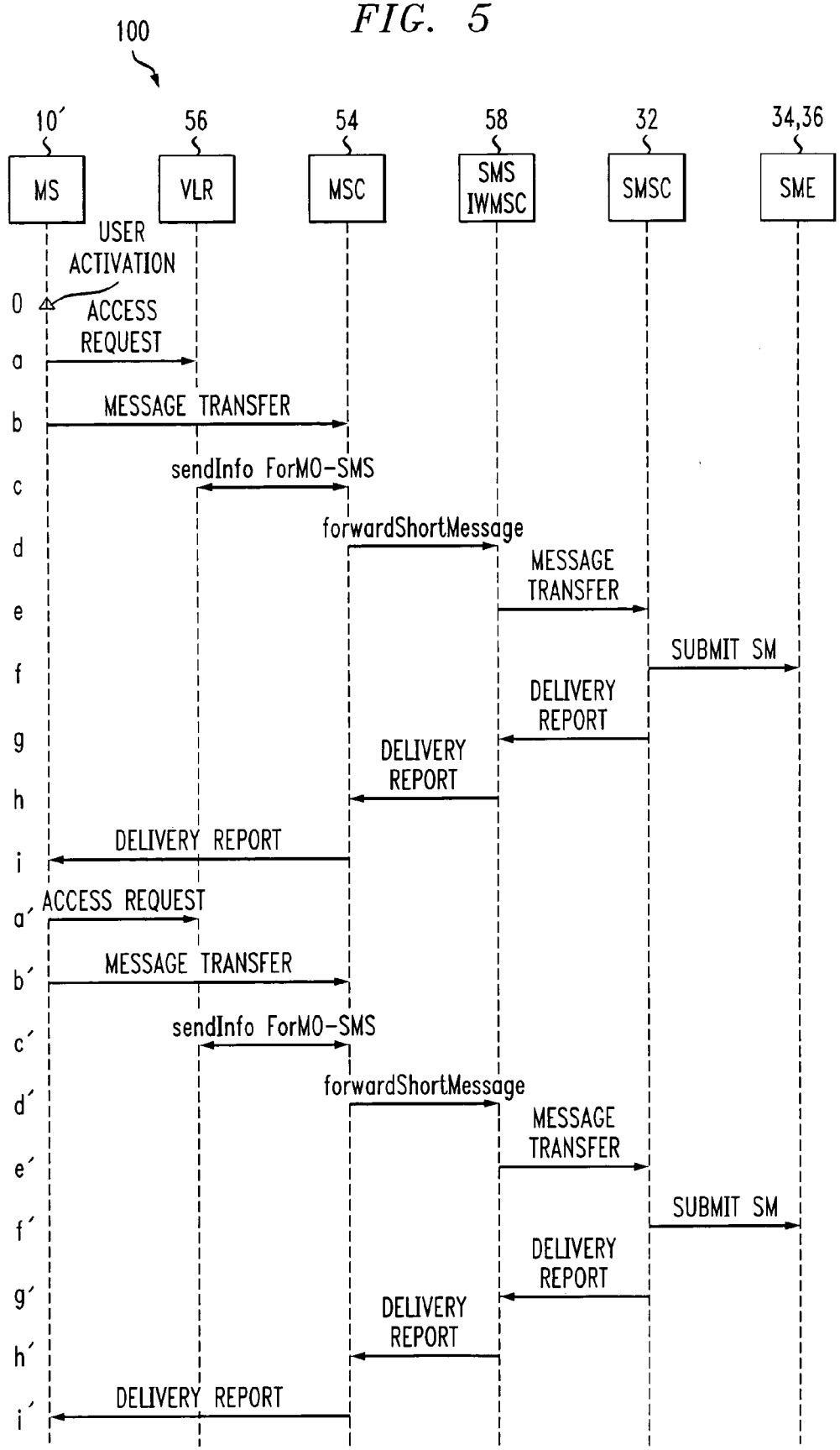
FIG. 5 is a call flow diagram for a mobile-originated client-based multicast short message scenario associated with at least one aspect of the invention.

As described above, the originating SME 10 (FIG. 1) or another type of messaging entity provides client-based multicast message transmission by individually transmitting the message to each specified recipient. The SMSC 32 (FIG. 2) and the various networks that will process the message can use the point-to-point message handling processes for each individual message. With reference to FIG. 5, a mobile-originated client-based multicast short message scenario in a wireless network is depicted in a call flow diagram. This scenario reflects how a typical wireless network will process the message to each recipient after the MS user activates the multicast message transmission (line 0). Other types of networks may process messages in a similar manner. The originating MS 10', VLR 56, MSC, 54, SMS IWMSC 58, SMSC 32, first terminating SME 34, and second terminating SME 36 described above with reference to FIGS. 2 and 3 are depicted across the top of the call flow diagram to identify their involvement at certain stages of the processing.

At line a, the originating MS 10' requests access to the network from the VLR 56 for the first recipient of the message. This may also include an authentication process. Once access is granted, the message is transferred from the originating MS 10' to the MSC 54 (line b). At line c, the MSC 54 interrogates the VLR 56 to verify that the message transfer does not violate the supplementary services invoked or the restrictions imposed. After the verification is complete, the MSC 54 sends the short message to the SMS IWMSC 58 using the forwardShortMessage operation (line d). At line e, the SMS IWMSC 58 transfers the message to the SMSC 32. Once the first terminating SME is available, the SMSC 32 delivers the short message to the first terminating SME 34 (line f).

At line g, the SMSC 32 sends a delivery report to the IWMSC 58. The delivery report indicates that the message was successfully delivered to the first recipient (i.e., first terminating SME 34). Alternatively, if the message could not be successfully delivered, a failure report is sent. The IWMSC 58 acknowledges to the MSC 54 the success or failure of the forwardShortMessage operation by sending on the delivery/failure report (line h). If the originating MS 10' requested confirmation of message delivery, the MSC 54 returns the outcome of the mobile-originated short message operation by sending on the delivery/failure report (line i).

The process depicted in lines a-i is repeated to send the message to the second recipient as shown in lines a'-i.' Notably, there is no additional user interaction is required to continue the client-based multicast message transmission to the second recipient. Once the second terminating SME is available, the SMSC 32 delivers the short message to the second terminating SME 36 (line f'). If there are more than two recipients for the message, the process depicted in lines a-i is repeated again for each additional recipient.

In summary, the mobile terminal client-based example described above allows mobile user to send the same message to multiple recipients. It greatly simplifies the user's work when there is a need to send same message content to multiple recipients, particularly the time required to type the same message content repeatedly. Additionally, it increases network traffic and revenue for mobile operators.

When sending, for example, a short message with the same content to multiple people, the end user has to type the same message multiple times or have a fixed group of people set up in advance with the service provider. The client-based multicast message transmission solution described herein simplifies tedious work and eliminates repetitive work for the user.

The client-based multicast message transmission solution described herein may be based on terminal-oriented mobile application platforms, such as BREW, J2ME, SIM Application Toolkit, etc., to send the same message to multiple recipients. The solution saves the end user the repeated work and time required to send the same message multiple times using previous client-based message transmission methods. It is very useful and convenient in the situation of dynamic group communications.

The recipient list 22 (FIG. 1) can include recipients that are identified by a group name representing a previously setup list of multiple names with phone numbers that either are selected from the contact list 20 (FIG. 1) (e.g., address book) and/or individual recipients that are keyed in by the user. The message content is sent to each individual by, for example, looping through the recipient list. The process using the mobile logic loop through the recipient list sends each message separately.

Notably, the multicast message transmission solution described herein is terminal-based (i.e., client-based). Also, multiple recipients are permitted and the recipient list can be changed dynamically. The complexity of the solution is much less than current network-based multicast solutions. Additionally, the multicast message transmission solution described herein can be implemented in a terminal or client having an Internet or Web-based interface to other telecommunication networks.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for client-based multicast message transmission, the method including the steps:
    a) receiving from a messaging client a message content to be transmitted in a message;
    b) receiving delivery information for first and second recipients to whom the message is to be transmitted;
    c) receiving an instruction to begin the message transmission;
    d) transmitting the message from the client to the first recipient; and
    e) transmitting the message from the client to the second recipient;
    f) receiving a report indicating an outcome for the message transmission to the first recipient; and
    g) receiving a report indicating an outcome for the message transmission to the second recipient, wherein the delivery information for the first and second recipients is received from at least one of an input device associated with the client and a previously stored list of contacts associated with the client.

2. The method as set forth in claim 1 wherein the message content is received from an input device associated with the client.

3. The method as set forth in claim 2 wherein the input device includes at least one of a keypad, keyboard, pointing device, and voice recognition device.

4. The method as set forth in claim 1 wherein the message content is received from a saved message area associated with the client.

5. The method as set forth in claim 1, step b) further including:
    receiving delivery information for one or more additional recipients to whom the message is to be transmitted.

6. The method as set forth in claim 5 wherein at least one of the additional recipients is a previously defined recipient group received from a stored list of contacts, the recipient group including delivery information for third and fourth recipients to whom the message is to be transmitted, the method further including the steps:
    h) transmitting the message from the client to the third recipient; and
    i) transmitting the message from the client to the fourth recipient.

7. The method as set forth in claim 1 wherein the instruction to begin message transmission is received from an input device associated with the client.

8. A method for client-based multicast message transmission, the method including the steps:
    a) receiving from a messaging client a message content to be transmitted in a message;
    b) receiving delivery information for first and second recipients to whom the message is to be transmitted;
    c) receiving an instruction to begin the message transmission;
    d) transmitting the message to the first recipient and a request for a response indicating an outcome for the message transmission;
    e) transmitting the message to the second recipient and a request for a response indicating an outcome for the message transmission;
    f) receiving a report indicating an outcome for the message transmission to the first recipient; and g) receiving a report indicating an outcome for the message transmission to the second recipient.

9. The method as set forth in claim 8 wherein the message content, delivery information for first and second recipients, and instruction to begin the message transmission are received from an input device associated with the client.

10. The method as set forth in claim 9 wherein the input device includes at least one of a keypad, keyboard, pointing device, and voice recognition device.

11. The method as set forth in claim 8 wherein the message content is received from a saved message area associated with the client.

12. The method as set forth in claim 8 wherein the delivery information for the first and second recipients is received from a previously stored list of contacts associated with the client.

13. The method as set forth in claim 8, step b) further including:

receiving delivery information for one or more additional recipients to whom the message is to be transmitted.

14. The method as set forth in claim 13 wherein at least one of the additional recipients is a previously defined recipient group received from a stored list of contacts, the recipient group including delivery information for third and fourth recipients to whom the message is to be transmitted, the method further including the steps:

h) transmitting the message to the third recipient and a request for a response indicating an outcome for the message transmission;

i) transmitting the message to the fourth recipient and a request for a response indicating an outcome for the message transmission;

j) receiving a report indicating an outcome for the message transmission to the third recipient; and k) receiving a report indicating an outcome for the message transmission to the fourth recipient.

\* \* \* \* \*

UNITED STATES PATENT AND TRADEMARK OFFICE
CERTIFICATE OF CORRECTION

PATENT NO. : 7,646,741 B2
APPLICATION NO. : 10/692207
DATED : January 12, 2010
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1682 days.

Signed and Sealed this

Twenty-eighth Day of December, 2010

David J. Kappos
*Director of the United States Patent and Trademark Office*